United States Patent [19]

Frauenfelder et al.

[11] 4,059,420
[45] * Nov. 22, 1977

[54] BEARINGS AND RAPPING SHAFT IN ELECTROSTATIC PRECIPITATOR

[75] Inventors: Alfred Frauenfelder, Zollikerberg; Xaver Johann Huppi, Zurich, both of Switzerland

[73] Assignee: Elex A.G., Zurich, Switzerland

[*] Notice: The portion of the term of this patent subsequent to May 25, 1993, has been disclaimed.

[21] Appl. No.: 654,088

[22] Filed: Feb. 2, 1976

Related U.S. Application Data

[63] Continuation-in-part of Ser. No. 580,203, May 23, 1975, Pat. No. 3,958,844.

[51] Int. Cl.² .............................................. B03C 3/76
[52] U.S. Cl. ................................. 55/112; 308/237 A; 308/24
[58] Field of Search ................... 55/112, 300; 308/15, 308/20, 27, 237 A, 24, 36

[56] References Cited

U.S. PATENT DOCUMENTS

| 2,897,017 | 7/1959 | Kubodera | 308/15 |
| 3,844,742 | 10/1974 | Peterson | 55/112 |
| 3,920,085 | 11/1975 | Bourke | 55/112 |

FOREIGN PATENT DOCUMENTS

| 1,361,746 | 4/1964 | France |
| 1,449,521 | 7/1966 | France |

*Primary Examiner*—Bernard Nozick

[57] ABSTRACT

Bearings for rapping shaft for electrostatic precipitators including two bearings supported by two elongated rod members and a bearing block for receiving the rod support members in nesting relationship thereon, the rapping shaft including a wear ring on the outer periphery thereof, the wear ring being detachably mounted to the shaft and disposed in contacting relationship with the bearings.

7 Claims, 3 Drawing Figures

BEARINGS AND RAPPING SHAFT IN ELECTROSTATIC PRECIPITATOR

CROSS REFERENCE TO RELATED APPLICATION

The present invention is a continuation-in-part of co-pending application, Ser. No. 580,203, Filed May 23, 1975 by Xaver J. Huppi and Alfred Frauenfelder now U.S. Pat. No. 3,958,844 issued 5/25/76.

BACKGROUND OF THE INVENTION

The invention relates to rapping shaft drive means for electrostatic precipitators and more particularly relates to the bearings for a rapping shaft for electrostatic precipitators which are supported by two elongated rod members and a bearing block for receiving the rod members in nesting relationship thereon.

Electrostatic precipitators are provided with discharge and collecting electrodes which attract particulate matter from contaminated air streams passing through the precipitators. Particulate matter or dust which piles up on these electrodes must be removed by shaking or washing of these electrodes. Normally, the shaking is accomplished by vibrators or rapping devices. Generally, such devices have a rotating shaft with tumbling hammers fixed thereto and each of the hammers strikes a rapping rod linked to one or more discharge or collecting electrodes so as to shake or vibrate them. These rotating shafts are supported by bearings which are subjected to wear and tear during the rotation of the rotating shaft with the tumbling hammers affixed thereto.

Wear and tear of the bearings is generally due to the dust content in the gases to be cleaned wherein the dust or particulate matter in the gas streams penetrate into the bearings thereby producing wear and tear of the bearings as well as the shaft. In some operations chemical components in the gas stream attribute to corrosion of the bearings and shafts. And, even further, in other operating environments, the temperature of the gases which are passing through the precipitator, which in some cases are in the neighborhood of 400° C, and higher, adds to the wear and tear of these bearings and shafts. Thus, the atmosphere inside a precipitator together with the wear and tear from dust, as mentioned previously, do not allow for proper lubrication of the bearings.

In present day operations, it is common to use dry slide bearings without lubrication whereby the bearing sleeves and the shaft have to be replaced after the wear and tear has reached a certain level. For example, French Pat. No. 1,361,746 teaches dry bearings with a back rest whereby the supporting parts can be readjusted from time to time. However, wear and tear of the shaft cannot be prevented by this type of bearing. Another French patent, French Pat. No. 1,449,521, teaches a shaft resting on roller or ball bearings on which the inner rings of the bearings are sliding upon two supporting bolts so that when the roller bearing and their supporting bolts are worn they can be replaced. However, this has not completely alleviated the problem. Firstly, dust continues to penetrate into the ball bearings until the ball cage is pushed to one side and finally jammed at the supporting frame of the bearings. Secondly, in conjunction with the penetration of the dust, the outer ring of the ball bearing starts to dig a groove into the rapping shaft which after a while will have to be replaced.

SUMMARY OF THE INVENTION

In the present invention it is recognized that it is desirable to provide bearings for a rapper shaft of an electrostatic precipitator. Furthermore, it is recognized that it is desirable to provide bearings for a rapping shaft having a substantially long life with a minimum amount of maintenance.

According to the present invention, a rapping shaft having a detachably mounted wear ring thereon turns upon two bearings whereby wear occurs between the bearings and the detachably mounted wear ring and not the rapping shaft.

More particularly, the present invention provides in combination with an electrostatic precipitator having a housing with a flow through inlet and a flow through outlet and a plurality of discharge and collecting electrodes therein, the housing including an opening therein with a rapping shaft extending therethrough, the rapping shaft being in communication with rapping means for the electrodes, a bearing assembly for the rapping shaft comprising two spaced bearings each supported by an elongated rod member mounted in spaced relation in a bearing block, the rapping shaft including a wear ring on the outer periphery thereof, the wear ring being detachably mounted to the shaft and disposed in contacting relationship with the bearings.

It is to be understood that the description of the examples of the present invention given hereinafter are not by way of limitation, and various modifications within the scope of the present invention will occur to those skilled in the art upon reading the disclosure set forth hereinafter.

Referring to the drawing.

Figure 1:
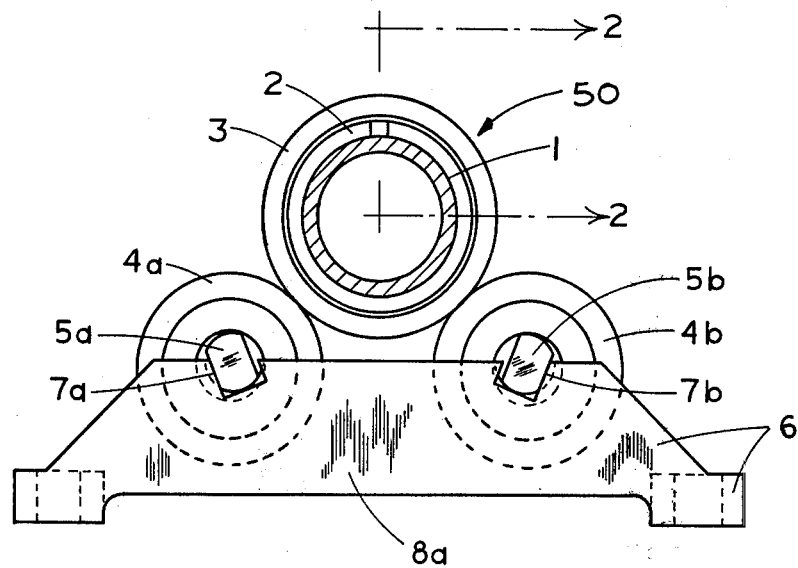
FIG. 1 is a sectional view illustrating the bearings for a rapping shaft of the present invention.

In the accompanying drawing, in FIG. 1, a bearing assembly of the present invention is shown, the bearing assembly being provided with a shaft 1 upon which a hardened wear ring 3 having a circular outer surface and a tapering inner surface is fastened by means of a split taper sleeve 2, the split taper sleeve 2 being wedged between the outer surface of the shaft 1 and the inner surface of the wear ring 3. The split taper sleeve 2 and hardened wear ring 3 are further held in place by a threaded sleeve 9 and a locking washer 10, threaded sleeve 9 being disposed around the outer periphery of taper sleeve 2 with locking washer 10 being sandwiched between the sleeve 9 and the ring 3.

The shaft 1 is illustrated as being hollow and may be a tube with a relatively thin wall thickness, but, it may also be solid. The hardened ring 3 rests and rolls upon rolls 4a and 4b which are turning on two rod members 5a and 5b, rolls 4a and 4b as well as rod members 5a and 5b being preferably of a hardened material or having their surfaces hardened by any known surface hardening treatment. Rod members 5a and 5b are illustrated as bolts having two flat opposed sides with arcuate sections disposed between the flat sides, the radius of curvature of the arcuate sections being approximately the same as the radius of curvature of the inner periphery of the rollers 4a and 4b.

A bearing block 6 with a U-shaped cradle is provided with a pair of rod member receiving means therein, the rod member receiving means being illustrated as slots 7a and 7b. Each of the vertically extending legs 8 of the U-shaped block 6, only one being shown in FIG. 1, includes two slots 7a and 7b at the upper extremity thereof, slot 7a being on one side of each leg and the slot 7b being on the opposite side of the leg. In a preferred embodiment, it is noted that the slots extend in a downward and inwardly direction and the bolts 5a and 5b rest within said slots. Further, slots 7 are in spaced alignment with opposing slots 7 in the opposed vertically extending leg 8b so that the bolts 5a and 5b are in parallel. Slots 7a and 7b are generally slightly larger than the bolts 5 received thereby so that the bolts 5 may be removed from the block 6 with very little difficulty.

As wear and tear of the bolts 5 and rollers 4 reach an inoperable stage, in order to replace these worn parts of the bearing assembly, the shaft 1 is pushed up and lifted upon the opposite roll. For example, if roll 4b and bolt 5b are to be removed, the shaft 1 is pushed up and lifted upon the opposite roll, roll 4a, wherein the roll 4b together with the bolt 5b are removed from the block 6 with the fingers. Further, if the bolt 5b has been damaged by wear and tear only on one side then the worn side is mechanically re-worked or turned down and the bolt with its roller reset into working position. When wear and tear of both the bolt and roller are beyond re-working, both parts may be replaced by a new pair of bolts and rollers at a minimal cost.

Another advantage of the present invention is that since the rapping shaft is not subject to wear and tear, it is possible to use a tube with a relatively thin wall thickness. Such a tube has the advantage of lighter weight compared to solid shafts and also reduces the friction in the bearings and as a consequence causes less wear and tear on the bearing assembly.

Figure 2:
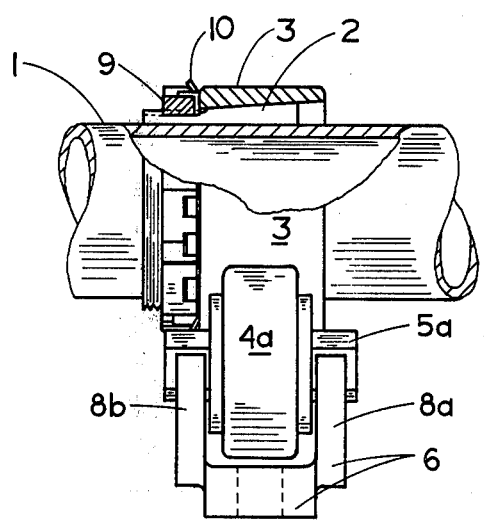
FIG. 2 is a side view partially in section taken along line 2—2 of FIG. 1.
Figure 3:
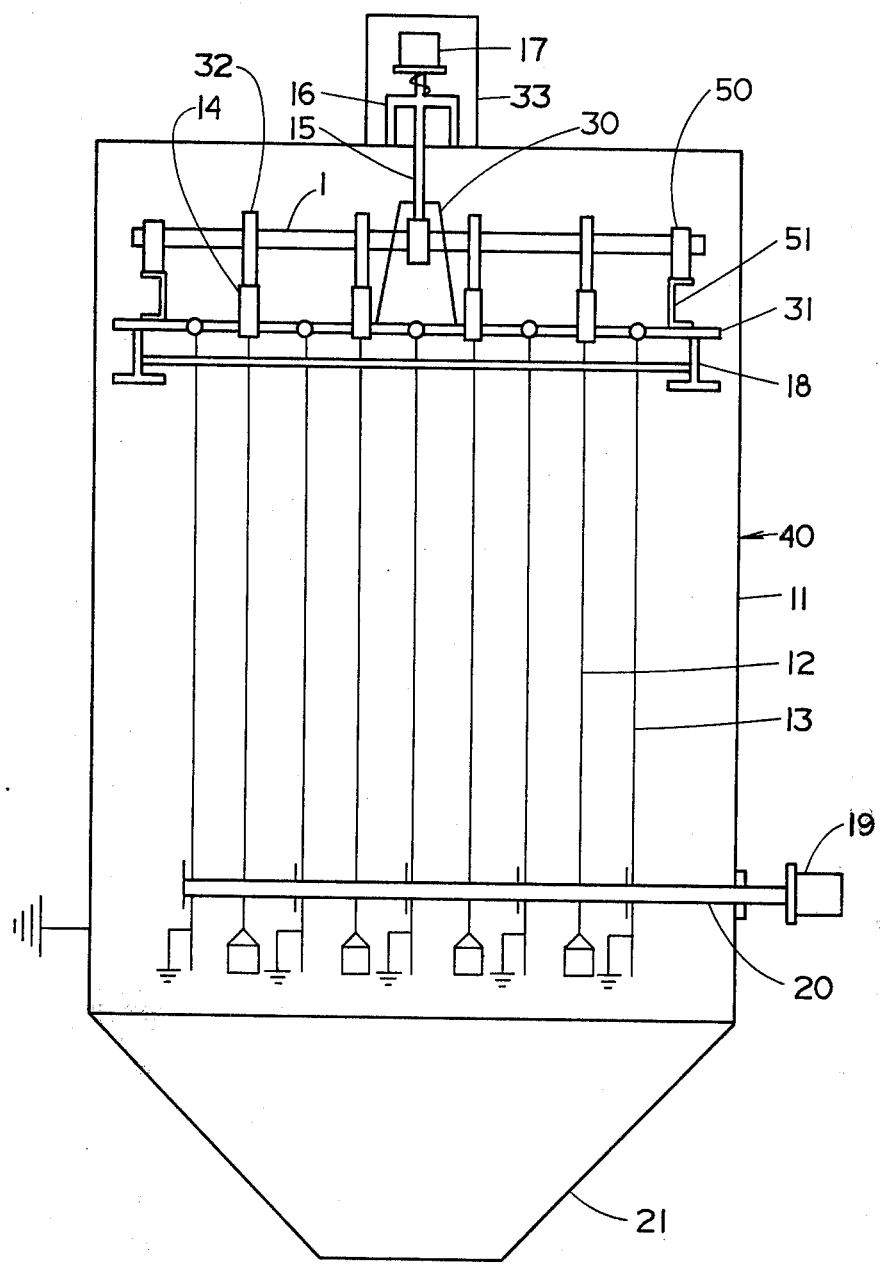
FIG. 3 is a schematic illustration of a portion of a typical electrostatic precipitator having conventional electrode rappers utilizing a preferred bearing assembly of the present invention as shown in FIG. 1.

In FIG. 3, there is illustrated one electrostatic precipitator utilizing the bearing assembly as previously described and shown in FIGS. 1 and 2. As shown, an electrostatic precipitator generally designated by the numeral 40 is provided with an outer shell 11 which directs a flow of particle-laden gases past a plurality of discharge electrodes 12 and a plurality of collector plates 13. The discharge plates are supported by structural members 14 which are themselves supported by support frame 30 and elongated support member 31. Hanger rod 15 is provided to extend through insulator 16 which electrically isolates the rod 15 from the motor housing 33, shell 11 and collector plates The hanger rod 15 extends downwardly and is attached to shaft 1. Shaft 1 includes a plurality of hammers 32 thereon and is supported by the bearing assembly 50, bearing assembly 50 being supported by support member 51. Support member 51 is generally a channel-shaped member which rests upon elongated support member 31, support member 31 usually being a channel-shaped member which extends across the top of the housing 40.

The discharge electrodes 12 are supplied with high voltage electric current by means of any conventional system (not system) which are known in the art.

As the particle-laden gas passes through shell 11, the particles are charged in the ionization field between the discharge electrode wires 12 and collector plates 13. The charged particles migrate toward the flat surfaces of plates 13 and collect thereon. These collected particles must be removed periodically to maintain efficient collection.

A rapping drive source 17 is connected to the hanger rod 15 so that vibrations generated from the rapping source are transmitted to the electrodes 12 through the structural members 14.

The collector plates 13 are supported by structural members 18 which are an integral part of shell 11. Plates 13 are also rapped by a rapping source 19 similar to source 17, connected to the electrodes 13 by a rod 20. Thus, when the rapping sources are energized, the electrodes are vibrated thereby dislodging accumulated dust particles which fall into a hopper 21 from which they are periodically removed.

As viewed in FIG. 3, the particle-laden gas is flowing between the lanes formed by collector plates 13 and away from the observer. The lanes may be several feet long so that several hanger rods 15 may be positioned along the lanes, one behind the other. Rapping drive sources 17 will similarly be positioned.

It is realized that other changes may be made to the specific embodiment shown and described without departing from the principals and spirit of the present invention.

What is claimed is:

1. In combination with an electrostatic precipitator having a housing with a flow through inlet and a flow through outlet and a plurality of discharge and collecting electrodes therein, said housing including an opening therein with a rapping shaft extending therethrough, said rapping shaft being in communication with rapping means for said electrodes, a bearing assembly for said rapping shaft comprising: two spaced bearings each supported by an elongated rod member mounted in spaced relation in slots open at the top extendng downwardly into a bearing block, the rapping shaft including a wear ring on the outer periphery thereof, the wear ring being detachably mounted to said shaft and disposed in contacting relationship with said bearings.

2. The combination of claim 1 wherein said rod members are bolts having two flat opposed sides with arcuate sections disposed between said flat sides, the radius of curvature of said arcuate sections being approximately the same as the radius of curvature of the inner periphery of said bearings.

3. The combination of claim 1 wherein said bearing block includes a U-shaped cradle with a pair of rod member receiving means therein, the rod member receiving means including slots in each of the vertically extending legs of the U-shaped cradle, said slots being in spaced alignment.

4. The combination of claim 3, said slots being disposed at the upper extremity of said vertically extending legs, said slots being on opposite sides of said leg.

5. The combination of claim 4, said slots extending in a downward and inwardly direction.

6. The combination of claim 3, said slots being slightly larger than the rod members received thereby whereby said rod members may be removed with very little difficulty.

7. The combination of claim 1, said wear ring having a circular outer surface and a tapering inner surface, said wear ring being attached to said rapping shaft by a split taper sleeve, said split taper sleeve being wedged between said wear ring and said shaft.

* * * * *

UNITED STATES PATENT OFFICE
CERTIFICATE OF CORRECTION

Patent No. 4,059,420                    Dated November 22, 1977

Inventor(s) Alfred Frauenfelder et al.

It is certified that error appears in the above-identified patent and that said Letters Patent are hereby corrected as shown below:

Column 2, line 46, after "assembly" insert -- 50 --;

line 47, after "assembly" insert -- 50 --.

Column 3, line 47, "plates" (second occurrence) should read -- electrodes --; line 52, after "plates" insert -- 13 --; line 64 "system" (second occurrence) should read -- shown --.

Claim 1, Column 4, line 37, "extendng" should read -- extending --.

Signed and Sealed this

Eighteenth Day of April 1978

[SEAL]

Attest:

RUTH C. MASON  
Attesting Officer

LUTRELLE F. PARKER  
Acting Commissioner of Patents and Trademarks